United States Patent
Schorn et al.

(10) Patent No.: US 7,438,157 B2
(45) Date of Patent: Oct. 21, 2008

(54) MUFFLER FOR AN EXHAUST GAS SYSTEM

(75) Inventors: Juergen Schorn, Rutesheim (DE); Joerg Winkel, Weissach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 310 days.

(21) Appl. No.: 11/320,628

(22) Filed: Dec. 30, 2005

(65) Prior Publication Data

US 2006/0162995 A1   Jul. 27, 2006

(30) Foreign Application Priority Data

Jan. 26, 2005   (DE) .................. 10 2005 003 582

(51) Int. Cl.
*F01N 1/16* (2006.01)
*F01N 1/02* (2006.01)
*F02B 27/02* (2006.01)

(52) U.S. Cl. .................. 181/237; 181/254; 181/272; 181/275; 181/258; 60/312; 60/322

(58) Field of Classification Search .................. 181/237, 181/236, 250, 253, 254, 276, 269, 272, 275, 181/251, 268, 258; 60/322, 312, 324, 299
See application file for complete search history.

(56) References Cited

U.S. PATENT DOCUMENTS

| | | | | |
|---|---|---|---|---|
| 1,403,614 A | * | 1/1922 | Malsack .................. | 181/254 |
| 1,512,210 A | * | 10/1924 | Gaskins .................. | 181/254 |
| 2,625,234 A | * | 1/1953 | Fina .................. | 181/239 |
| 3,154,174 A | * | 10/1964 | Haining .................. | 181/254 |
| 4,032,310 A | * | 6/1977 | Ignoffo .................. | 422/170 |
| 4,913,260 A | * | 4/1990 | Fallon .................. | 181/254 |
| 5,280,143 A | * | 1/1994 | Kakuta .................. | 181/250 |
| 5,355,973 A | | 10/1994 | Wagner et al. | |
| 5,917,161 A | * | 6/1999 | Fuhrmann .................. | 181/237 |
| 6,598,390 B2 | * | 7/2003 | Chang .................. | 60/323 |
| 6,918,463 B2 | * | 7/2005 | Takahashi et al. .................. | 181/237 |
| 2007/0045043 A1 | * | 3/2007 | Hoerr et al. .................. | 181/250 |
| 2007/0158136 A1 | * | 7/2007 | Shimomura et al. .................. | 181/251 |
| 2007/0272479 A1 | * | 11/2007 | Mirlach et al. .................. | 181/253 |

FOREIGN PATENT DOCUMENTS

| | | |
|---|---|---|
| DE | 38 35 079 | 4/1990 |
| DE | 295 01 002.9 | 1/1995 |
| DE | 295 12 732 U1 | 8/1995 |
| DE | 195 03 322 | 8/1996 |
| DE | 19837097 A1 * | 2/2000 |
| DE | 10030490 A1 * | 1/2002 |
| EP | 02 26 022 | 6/1987 |
| JP | 9-228819 | 9/1997 |

* cited by examiner

*Primary Examiner*—Edgardo San Martin
(74) *Attorney, Agent, or Firm*—Crowell & Moring LLP

(57) ABSTRACT

A muffler for an exhaust gas system of an internal-combustion engine has an exhaust gas inlet and a first flow pipe arranged inside the muffler and completely penetrating the muffler. A shut-off device is arranged in the first flow pipe, for the shutting-off and opening-up an exhaust gas tail pipe which is situated downstream of the muffler and is connected with the first flow pipe. A second flow pipe partially penetrates the muffler, and has an overflow path between the first and second flow pipes situated inside the muffler. The first and the second flow pipes are connected with the exhaust gas inlet by way of a branching element and the shut-off device is arranged upstream of the muffler in the first flow pipe.

9 Claims, 2 Drawing Sheets

MUFFLER FOR AN EXHAUST GAS SYSTEM

BACKGROUND AND SUMMARY OF THE INVENTION

This application claims the priority of German patent document 10 2005 003 582.5, filed Jan. 26, 2005, the disclosure of which is expressly incorporated by reference herein.

The invention is directed to a muffler for an exhaust gas system of an internal-combustion engine of a motor vehicle.

FIG. 5 of German Patent Document DE 38 35 079 A1 shows a muffler of the generic type, which has a single exhaust gas inlet and two exhaust gas tail pipes. The muffler is completely penetrated by a first flow pipe which has the single exhaust gas inlet as well as one of the exhaust gas tail pipes. A shut-off device (in the form of a so-called exhaust gas flap which can be operated by means of a swiveling mechanism) for shutting off and opening up the first flow pipe is arranged in the exhaust gas tail pipe, situated downstream of the muffler. A second flow pipe is arranged inside the muffler and extends by means of the second exhaust gas tail pipe out of the muffler.

When the shut-off device is opened, the exhaust gas flow of the internal-combustion engine enters via the exhaust gas inlet, and can be guided via the first flow pipe, unhindered to the exhaust gas tail pipe. When the shut-off device is closed, the exhaust gas flows out by way of a perforation in the first flow pipe arranged inside the muffler, penetrates a connection piece arranged in a dividing wall and enters by way of a perforation in the second flow path, and can thus be removed by way of the second exhaust gas tail pipe. The two perforations and the connection piece arranged in the dividing wall therefore form an overflow path between the first and the second flow pipe situated inside the muffler.

One object of the invention to provide a muffler of the initially mentioned type, whose function and the integration into an exhaust gas system are improved.

This and other objects and advantages are achieved by the muffler configuration according to the invention, in which exhaust gas noise exiting from the exhaust gas tail pipe is favorably influenced by the arrangement of the shut-off device upstream of the muffler. By positioning the shut-off device in front of the muffler according to the invention, a clear sound difference can be achieved when the exhaust gas produced by the internal-combustion engine is guided through the first or the second flow pipe. By means of the branching element, which connects the exhaust gas inlet with the first and second flow pipes, the muffler according to the invention can also be integrated in conventional exhaust gas systems and, as required, can also be retrofitted into an exhaust gas system without shut-off devices.

In one embodiment of the invention, it is advantageous that no separate branching element is required, because the catalyst housing is equipped with this branching element. It can therefore be provided according to a preferred embodiment that the catalyst housing has a front plate which forms the branching element. In this case, the front plate, for example, can have branching openings which are adjoined by the first and second flow pipes.

According to a further embodiment of the invention, the catalyst housing is fastened directly to the muffler, so that exhaust gas pipes, which are otherwise provided between the catalyst housing and the muffler, can be eliminated.

The catalyst housing can be situated at least partly inside the muffler, permitting a simple connection between the catalyst housing and the muffler. If at least the front plate of the catalyst housing is situated inside the muffler, it can form a wall of the muffler.

According to another embodiment of the invention, the shut-off device can advantageously be arranged outside the muffler, which permits a simple connection of the shut-off device with a drive provided for this purpose.

In a particularly preferred embodiment, the muffler has a cutout which accommodates the bypass section that has the shut-off device. In comparison to a conventional muffler without a shut-off device, no enlarged installation space is therefore required in the case of the muffler according to the invention.

If the overflow path has a muffling device, the sound of the muffler will differ further when the shut-off device is opened or closed. Particularly preferably, the muffling device may have a perforated dividing wall which is arranged inside the muffler.

In another preferred embodiment of the overflow path, when the shut-off device is opened, a chamber having a volume that is bounded by the first dividing wall, is coupled by way of the inlet to the first flow pipe. This arrangement favorably influences the sound of the muffler when the shut-off device is opened.

A second dividing wall can also be provided, to support the first and the second flow pipe inside the muffler.

If the second dividing wall has a perforated construction, another chamber, whose volume can be coupled to the first chamber, can be formed within the muffler, favorably influencing the muffling of the noise of the exhaust gas.

The muffler according to the invention can advantageously be connected with a continuing exhaust gas outlet which may also be provided for a conventional muffler without shut-off devices. Thus, an exhaust gas system in a modular construction can be provided, in which case the muffler with the shut-off device can easily be exchanged for a muffler without a shut-off device and vice-versa.

The modular construction is further developed if the catalyst housing, the muffler with the two flow pipes, the exhaust gas tail pipe and the shut-off device form a preassembled constructional unit, which can be inserted into the motor vehicle with the exhaust gas system.

Other objects, advantages and novel features of the present invention will become apparent from the following detailed description of the invention when considered in conjunction with the accompanying drawings.

DETAILED DESCRIPTION OF THE DRAWINGS

Figure 1:
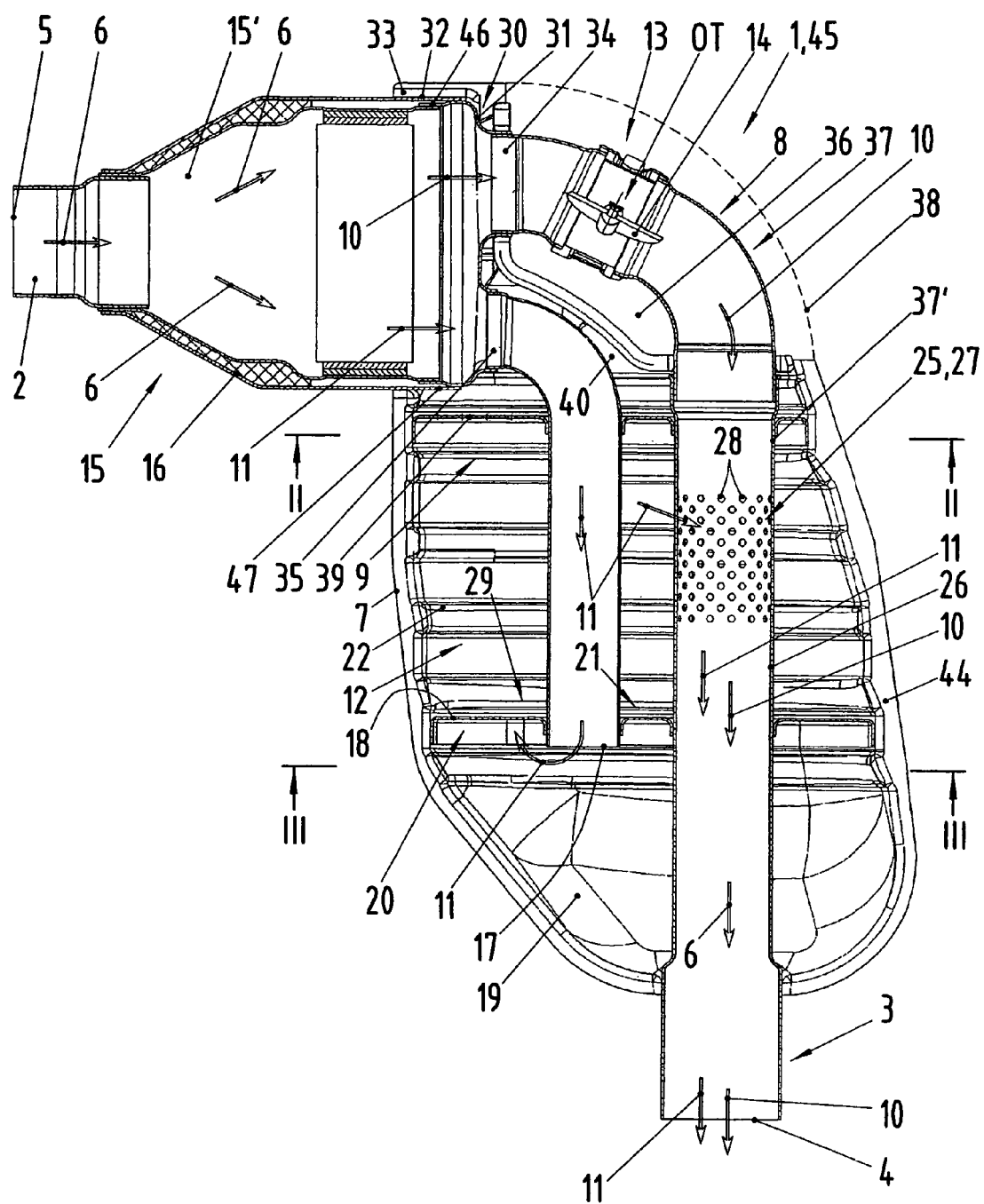
FIG. 1 is a sectional view of a muffler of an exhaust gas system of an internal-combustion engine (not shown)

FIG. 1 is a longitudinal sectional view of a muffler 1 of an exhaust gas system (not further illustrated) for an internal-combustion engine of a motor vehicle. For an engine, which has two cylinder banks, the exhaust gas system preferably has a double-flow construction, and correspondingly, the exhaust gas system comprises such a muffler 1 for each cylinder bank. By means of an exhaust gas inlet 2, the muffler 1 is connected with a pipe train which is not shown, and which (if applicable), is connected in a known manner with the internal-combustion engine by means of a so-called precatalyst. In addition, the muffler 1 has an individual exhaust gas tail pipe 3 on the output side, which, if applicable, together with the other exhaust gas tail pipe of the other muffler of the exhaust gas system, leads to an exhaust gas outlet (not shown) at the rear of the motor vehicle.

The exhaust gas tail pipe 3 has a tail pipe opening 4, and the exhaust gas inlet 2 has an inlet opening 5. As a result, a flow direction for the exhaust gas, which is marked by arrows 6 directed downstream, occurs within the muffler 1. The muffler 1, which has a muffler housing 7, is situated between the inlet opening 5 and the tail pipe opening 4. In this muffler housing 7, first and second flow paths (indicated by arrows 10, 11) for the exhaust gas entering at the inlet opening 5 are formed by means of first and second flow pipes 8, 9. Within the muffler housing 7, an overflow path 12 is formed between the first and the second flow pipe 8 and 9 or between the first and the second flow path 10 and 11 respectively, which overflow path 12 makes it possible to introduce exhaust gas exiting from the second flow pipe 9 into the first flow path 8 within the muffler 1.

The first flow pipe 8 penetrates the muffler 1 completely and ends outside the muffler 1 with an exhaust gas tail pipe 3. A shut-off device 13 is also arranged inside the flow pipe 8. It has a movable valve body, particularly in the form of a movable flap 14, which can shut off the first flow pipe 9 for the first flow path 10, or open it up. For example, a drive (not shown) can be assigned to the shut-off device 13, which drive can move the flap 14 into the opening position OT illustrated in FIG. 1 for opening up, and into a closing position (not shown), for shutting off the first flow pipe 8. Upstream (thus in the opposite direction to the arrow 6), a catalyst 15 with an exhaust gas treatment insert 15' arranged in a catalyst housing 16 is connected in front of the muffler 1, which catalyst 15 with its catalyst housing 16 is, however, partially integrated in the muffler housing 7.

Inside the muffler 1, the second flow pipe 9 ends with a mouth 17 inside the muffler housing 7, so that the exhaust gas can flow out into the muffler housing 7, through the overflow path 12 into the first flow pipe 8, and can finally flow to the exhaust gas tail pipe 3. In the overflow path 12, a first dividing wall 18 is situated inside the muffler housing 7, upstream of the mouth 17, so that, within the muffler housing 7, a first chamber 19 is bounded by a first side 20 of the dividing wall 18. On the second side 21 of the first dividing wall 18, a second chamber 22 is formed inside the muffler housing 7. For overflowing of the exhaust gas from the first chamber 19 into the second chamber 22, the first dividing wall 18 has at least one opening, but preferably a perforation 24 comprising several openings 23, as illustrated in the cross-sectional view according to FIG. 3 (in which identical parts are provided with the same reference numbers). Thus, the exhaust gas flow exits from the mouth 17 on the first side 20 of the dividing wall 18, enters into the chamber 19, flows through the perforation 24 of the first dividing wall 18 and thus arrives in the second chamber 22, from which the exhaust gas is admitted to the first flow pipe 8 by way of an inlet 25 (preferably formed by a perforation 27 with several openings 28 penetrating the jacket 26 of the first flow pipe 8) in order to finally reach the exhaust gas tail pipe 3. The inlet 25 is therefore situated inside the second chamber 22 and on the second side 21 of the first dividing wall 18. A muffling device 29 for the exhaust gas, which has at least the perforated first dividing wall 18, is therefore situated within the overflow path 12. If, as a result of a corresponding configuration, the inlet 25 causes a muffling of the exhaust gas, the inlet 25, if required, is to be assigned to the muffling device 29. Therefore, when the flap 14 is open exhaust gas flows from the inlet opening 5 in the direction of the exhaust gas tail pipe 3 via the first flow pipe 8 and the first flow path 10. When the flap 14 is closed and the first flow pipe 8 is shut off, on the other hand, the second flow path 11 (within the second flow pipe 9) is active, and couples into the first flow pipe 8 via the overflow path 12 and subsequently the inlet 25. Thus, the inlet 25 is used, on the one hand, to introduce the exhaust gas from the second flow path 11 into the first flow path 10 when the shut-off device 13 closes off the first flow pipe 8 and, on the other hand, to couple in a muffler volume (second chamber 22) for the first flow path 10 when the shut-off device 13 opens up the first flow pipe 8, or the flap 14 is in the opening position OT.

So that the exhaust gas flow entering by way of the exhaust gas inlet 2 (depending on the position of the shut-off device 13) can be introduced into the first or second flow pipe 8 or 9, a branching element 30 arranged downstream behind the exhaust gas inlet 2 is connected with both the first and second flow pipes 8 and 9. The catalyst 15 with its catalyst housing 16 is situated between the branching element 30 and the exhaust gas inlet 2. The branching element 30 is a component of the catalyst housing 16 and preferably forms its front plate 31 which (as a result of the partial integration of the catalyst 15 in the muffler 1) comes to be situated inside the muffler housing 7, and simultaneously forms a wall of the muffler housing 7. In the illustrated embodiment, the catalyst 15 is therefore fastened by means of its housing 16 directly on the muffler 1. For this purpose, the muffler housing 7 has a receiving duct 32 which is formed by a flange 33 surrounding the catalyst housing 16.

For connecting the two flow pipes 8 and 9 with the exhaust gas inlet 2, the front plate 31 has two corresponding branching openings 34 and 35, into which the assigned first and second flow pipes 8 and 9 respectively, are inserted. The branching opening 35 is situated inside the muffler housing 7, and the branching opening 34 passes through the muffler housing 7 in the area of a housing cutout 36 of the muffler housing 7. A curved bypass section 37 of the first flow pipe 8 extends inside this cutout 36, and is therefore situated outside the muffler housing 7, but within an approximately quadrantal imaginary edge contour 38 (indicated by a broken line) of the muffler housing 7. The muffling device 29 is bypassed by the bypass section 37 and an adjoining pipe piece 37' of the first flow pipe 8. The shut-off device 13 is arranged in the bypass section 37.

Figure 2:
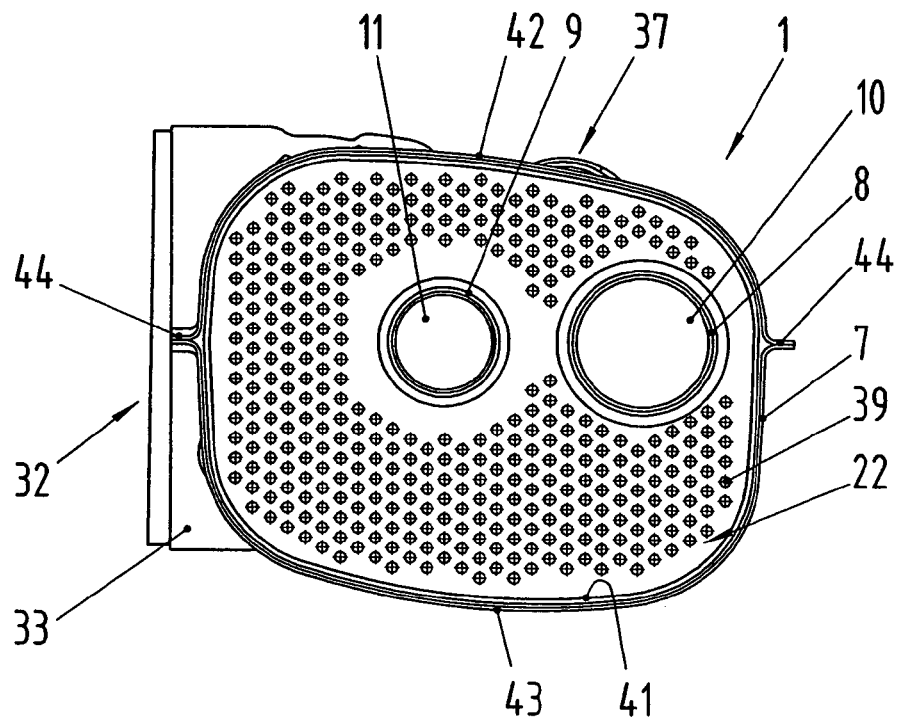
FIGS. 2 and 3 are sectional views along Lines II-II and III-III respectively of the muffler according to FIG. 1.

The sectional views of the muffler housing 7 in FIGS. 1 and 2 indicate that, in the muffler 1 upstream of the inlet 25, a second dividing wall 39 bounds the second chamber 22 and divides the muffler housing 7 into a third chamber 40, which is penetrated by the second flow pipe 9 partially extending through the muffler 1. The second dividing wall 39, like the first dividing wall 18, has at least one opening, but preferably a perforation comprising several openings 23, whereby the volume of the third chamber 40 can act as a muffling volume for the second flow path 11. Furthermore, the second dividing wall 39, like the first dividing wall 18, serves to support the first and second flow pipes 8 and 9 inside the muffler housing 7, so that they are held opposite an interior wall 41 of the muffler housing 7.

Figure 3:
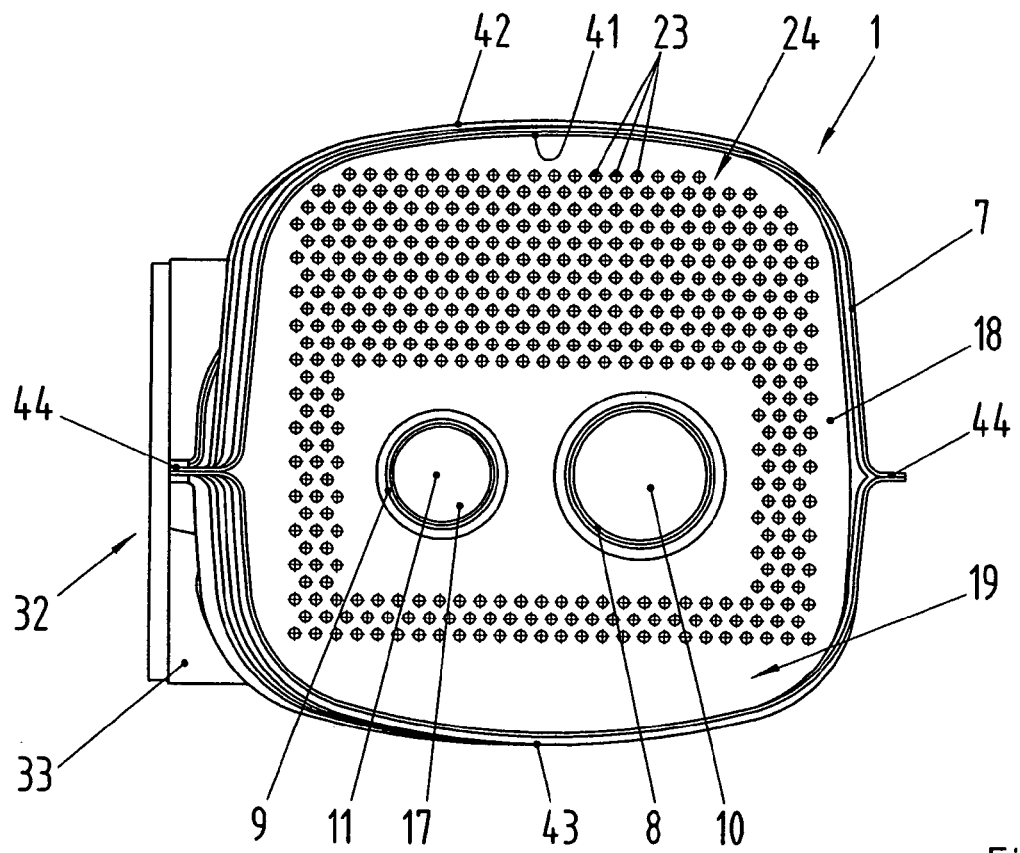

As illustrated in FIGS. 2 and 3, the muffler housing 7 is composed of two bowl-shaped housing parts 42 and 43 which each have an outward-bent edge strip 44 at which they are firmly connected with one another. Assembly of the two housing parts 42 and 43, thus the closing of the muffler housing 7, results in a preassembled constructional unit 45 which comprises the catalyst 15 with its housing 16, the muffler 1 with the two flow pipes 8 and 9, the exhaust gas tail pipe 3, the exhaust gas inlet 2 as well as the shut-off device 13. The constructional unit 45 can therefore be inserted as a module into the exhaust gas system of the motor vehicle.

Numerous embodiments of the muffler 1 are possible. In particular, the branching element 30 or the front plate 31 of the catalyst housing 16 has a surrounding collar 46 which may be constructed in one piece with the front plate 31, so that the branching element is pot-shaped. The collar 46 may be situated partially inside the catalyst housing 16 (that is, may be fitted into it). Alternatively, the branching opening 35 could be laterally arranged on the branching element 30, facing the second dividing wall 39 (not shown). Accordingly, the other branching opening 34 could start out approximately in the center from the front plate 31. In addition, it would be possible to construct the front plate 31 in a funnel shape, so that the flow of the exhaust gas can be optimized for the first flow pipe 8. In a modification, which is not shown, instead of the lateral branching opening starting out from the collar 46, a perforation could be constructed in the collar 46 or in the section 47 of the catalyst housing 16 situated inside the muffler housing 7. The perforation could be partial or be placed over the entire circumference of the collar 46 or the section 47.

The inlet 25 constructed as a perforation 27 in the first flow pipe 3 can be implemented as a surrounding separating cut (not shown) in the jacket 26, so that the flow pipe 8 is cut open between the first and second dividing wall 18, 39 and two pipe ends of the flow pipe 8 are situated opposite one another at a distance. The downstream pipe end could be expanded in a funnel-shaped manner. The mutual spacing of the two pipe ends can amount to, for example, from 10 mm to 30 mm.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Muffler for an exhaust gas system of an internal-combustion engine of a motor vehicle, comprising:
    an exhaust gas inlet;
    a first flow pipe arranged inside the muffler and completely penetrating the muffler;
    a shut-off device arranged in the first flow pipe, for shutting-off and opening-up communication of the first flow pipe with an exhaust gas tail pipe which is situated downstream of the muffler and is connected with the first flow pipe;
    second flow pipe which partially penetrates the muffler; and
    an overflow path between the first and second flow pipes, inside the muffler; wherein
    the first and the second flow pipes are connected with the exhaust gas inlet by way of a branching element;
    having a front plate with branching openings forming the branching element;
    a catalyst housing is arranged between the exhaust gas inlet and the branching element and is fastened directly to the muffler so as to be at least partially situated inside the muffler;
    the shut-off device is arranged upstream of the muffler in the first flow pipe;
    at least one bypass section of the first flow pipe extends outside the muffler;
    the shut-off device is arranged in the bypass section;
    a housing of the muffler has a housing cutout; and
    the bypass section extends through the housing cutout.

2. The muffler according to claim 1, wherein at least the front plate is situated inside the muffler.

3. The muffler according to claim 1, wherein the overflow path has a muffling device.

4. The muffler according to claim 3, wherein the muffling device has a first perforated dividing wall arranged inside the muffler.

5. The muffler according to claim 4, wherein:
    on a first side of the dividing wall, the second flow pipe leads into the muffler; and
    the first flow pipe inside the muffler has an inlet which is situated on a second side of the dividing wall.

6. The muffler according to claim 5, wherein a second dividing wall is arranged inside the muffler, upstream of the first dividing wall, which is penetrated by the first and the second flow pipe.

7. The muffler according to claim 6, wherein the second dividing wall is perforated and is arranged upstream of the inlet of the first flow pipe.

8. The muffler according to claim 7, wherein a single exhaust gas tail pipe extends out of the muffler.

9. The muffler according to claim 8, wherein the catalyst housing, the muffler with the two flow pipes, the exhaust gas tail pipe and the shut-off device form a preassembled construction unit which can be inserted into the motor vehicle.

* * * * *